United States Patent
Jensen (10) Patent No.: US 10,698,666 B2
(45) Date of Patent: Jun. 30, 2020

(54) AUTOMATICALLY BUILDING SOFTWARE PROJECTS

(71) Applicant: MICROSOFT TECHNOLOGY LICENSING, LLC, Redmond, WA (US)

(72) Inventor: Jonas B. Jensen, Oxford (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 230 days.

(21) Appl. No.: 15/858,279

(22) Filed: Dec. 29, 2017

(65) Prior Publication Data
US 2019/0205105 A1  Jul. 4, 2019

(51) Int. Cl.
| G06F 8/41 | (2018.01) |
| G06F 16/14 | (2019.01) |
| G06F 8/61 | (2018.01) |
| G06F 9/455 | (2018.01) |
| G06F 8/71 | (2018.01) |
| G06F 8/75 | (2018.01) |

(52) U.S. Cl.
CPC .............. *G06F 8/41* (2013.01); *G06F 8/71* (2013.01); *G06F 9/45512* (2013.01); *G06F 16/148* (2019.01); *G06F 8/61* (2013.01); *G06F 8/75* (2013.01)

(58) Field of Classification Search
CPC ............. G06F 8/41; G06F 8/71; G06F 16/148
See application file for complete search history.

(56) References Cited

U.S. PATENT DOCUMENTS

| 5,732,275 | A   | * | 3/1998  | Kullick .................. G06F 8/65 717/170 |
| 6,529,985 | B1  |   | 3/2003  | Deianov et al. |
| 6,779,187 | B1  |   | 8/2004  | Hammond |
| 6,959,441 | B2  |   | 10/2005 | Moore |
| 7,117,495 | B2  | * | 10/2006 | Blaser ..................... G06F 8/61 717/174 |
| 7,181,739 | B1  | * | 2/2007  | Harral ..................... G06F 8/61 717/170 |
| 7,353,507 | B2  |   | 4/2008  | Gazdik et al. |
| 7,373,406 | B2  | * | 5/2008  | Jones ............... H04L 29/12132 709/226 |
| 7,428,726 | B1  | * | 9/2008  | Cowan .................. G06F 11/368 717/121 |
| 7,971,255 | B1  |   | 6/2011  | Kc et al. |
| 8,010,495 | B1  | * | 8/2011  | Kuznetzov .......... G06F 9/45533 707/649 |

(Continued)

*Primary Examiner* — Chat C Do
*Assistant Examiner* — Douglas M Slachta
(74) *Attorney, Agent, or Firm* — Workman Nydegger (57) ABSTRACT

Methods, systems, and apparatus, including computer programs encoded on computer storage media, for automatically identifying and installing missing packages during an instrumented build. One of the methods includes intercepting, by a source code analysis system, a call from a build system that references a file system path. If the file system path does not exist on the build system, a search is performed to identify a source code package having a filename in the file system path, and the source code package is installed on the build system. After installing the source code package on the build system, the intercepted call is executed.

20 Claims, 3 Drawing Sheets

(56) References Cited

U.S. PATENT DOCUMENTS

| | | | |
|---|---|---|---|
| 8,225,281 B1* | 7/2012 | Hardinger | G06F 11/3664 |
| | | | 717/120 |
| 8,230,399 B2 | 7/2012 | Vertes | |
| 9,177,255 B1* | 11/2015 | Procopio | G06F 21/51 |
| 9,535,674 B2 | 1/2017 | Cooper et al. | |
| 2001/0052121 A1* | 12/2001 | Masuda | G06F 8/60 |
| | | | 717/170 |
| 2002/0092003 A1 | 7/2002 | Calder et al. | |
| 2003/0145317 A1* | 7/2003 | Chamberlain | G06F 8/61 |
| | | | 717/177 |
| 2008/0115117 A1* | 5/2008 | Wilkinson | G06F 8/443 |
| | | | 717/139 |
| 2011/0145924 A1* | 6/2011 | Kolsek | G06F 21/51 |
| | | | 726/25 |
| 2011/0276961 A1* | 11/2011 | Johansson | G06F 8/61 |
| | | | 717/178 |
| 2012/0110570 A1* | 5/2012 | Jacobson | G06F 9/45533 |
| | | | 718/1 |
| 2015/0248343 A1* | 9/2015 | Ionescu | G06F 8/70 |
| | | | 717/130 |
| 2016/0202960 A1* | 7/2016 | Minh Le | G06F 11/3624 |
| 2016/0378545 A1* | 12/2016 | Ho | G06F 9/50 |
| | | | 718/107 |

\* cited by examiner

AUTOMATICALLY BUILDING SOFTWARE PROJECTS

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot is a representation of the source code of the code base as the source code existed at a particular point in time. A snapshot may be thought of as including all the source code as of a particular point in time, although all the source code need not be explicitly stored for every snapshot.

Static analysis results can be used for a variety of practical applications, which include attributing source code contributions and generating data about large scale trends in code bases. Attributing source code contributions means attributing changes introduced by a snapshot to a particular developer entity responsible for committing the snapshot. A developer entity can be a single developer or a group of multiple developers. Each developer is typically a human, although a developer can also be a software program, e.g., a "robot," that writes source code. For example, a developer entity can be a lone developer, developers on a team, developers within a department of an organization, or any other appropriate group of developers. Static analysis systems can compute sophisticated metrics of source code contributions and present visualizations of such information. For example, a static analysis system can generate a lines-of-code graph that illustrates net lines of code contributed to a code base during a particular time period.

Source code in a code base is typically compiled in a build environment by a build system. The build environment can include an operating system; a file system; executable files, e.g., build scripts and utilities, interpreters, compilers, or source code generators; environment variables, e.g., variables that indicate a path to file system directories that contain source code files or executable files; and other configuration files for building source code in the code base.

Accurate source code analysis of source code in a software project often requires a static analysis system to instrument a build system used to build the software project. Instrumenting the build system allows the static analysis system to perform an instrumented build of the software project, during which the static analysis system can trace the build process by intercepting calls by the build system to compilers.

There are a variety of reasons that performing an instrumented build for software project can result in more accurate analysis of source code in the project. As one example, tracing a build process allows the static analysis system to identify precisely the source code that is built for the software project without having to emulate the actions of the build system. A variety of build system mechanisms make this information difficult to obtain without tracing the build. For example, build system preprocessors can make arbitrary textual substitutions in existing source code files before a compiler is called. Preprocessors can also generate temporary source code files that are compiled and then deleted by the build system when compilation is complete. In addition, some build utilities, e.g., the "make" utility on Linux and Unix operating systems, can be programmed to copy source code files from one place to another during the build process. For example, a build utility can copy a file from one location to another for compilation because another source code file may include or depend on the copied file. The copied file may then be deleted by the build system after compilation is complete. Furthermore, source code generators can generate source code at build time that does not exist before the build process is started. In all of these situations, merely having read access to the source code files in a file system is insufficient for a static analysis system to extract all the source code that is actually built by a build system.

While performing instrumented builds for software projects can result in more accurate analysis of source code, the need to perform the build at all is a scalability bottleneck for large-scale static analysis systems. This is mostly because some manual configuration and labor is usually required to set up the build environment, identify build commands, and launch build scripts. Project documentation may specify, in a human-readable way, what dependencies and build commands are required. However, automatically analyzing and understanding such natural language instructions is not feasible with current NLP technology. Such manual configurations are unsuitable for a static analysis system that seeks to build thousands or tens of thousands of software projects automatically. The problem becomes even worse for static analysis systems that compare properties of multiple snapshots to compute static analysis results. In these cases, the static analysis system needs to perform instrumented builds for many, possibly thousands, of individual snapshots of a single software project. Manually configuring all of these builds across thousands of software projects is simply not feasible for a scalable static analysis system.

SUMMARY

This specification describes how a source code analysis system can improve automatic builds of code bases by dynamically intercepting calls from the build process to install dependency packages as their contents are requested during a build. The techniques described in this specification allow the system to perform more successful builds and, even for builds that are unsuccessful, provides for more complete source code extraction.

Particular embodiments of the subject matter described in this specification can be implemented so as to realize one or more of the following advantages. A source code analysis system can perform automatic instrumented builds of many, possibly thousands or tens of thousands, of software projects without human intervention. This allows the source code analysis system to automatically analyze much more source code than would otherwise be possible. This also paves the way for a system to provide large-scale, automatic, distributed analysis of an arbitrary number of code bases.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a system can automatically handle missing dependencies during an instrumented build.

In this specification, a binary package, or for brevity, a package, is a collection of files to be installed on a build system. Binary packages typically include executables, shared libraries, and header files. The source code of a software project can be built into one or more binary packages for distribution and installation on one or more respective computing platforms. Some binary packages may include some source code from the software project. A package for a particular software project may also include other information, although such other information may not be relevant to the techniques described in this specification.

A package also specifies dependencies that are required to be installed in order for the package to be fully usable. A dependency has a name, and optionally a version and a location. A dependency is typically itself another package, although a dependency may also simply be an executable file or a library file. For example, the package can specify, as required dependencies, packages having certain executable files to be installed, e.g., compilers or linkers; libraries to be installed; and header files that must be present, to name just a few examples. In addition, dependencies themselves can also have other dependencies.

A repository is a collection of one or more packages. Often, package repositories are hosted on publically available networks, e.g., the Internet. A package repository system is a system that provides access to such package repositories.

Figure 1:
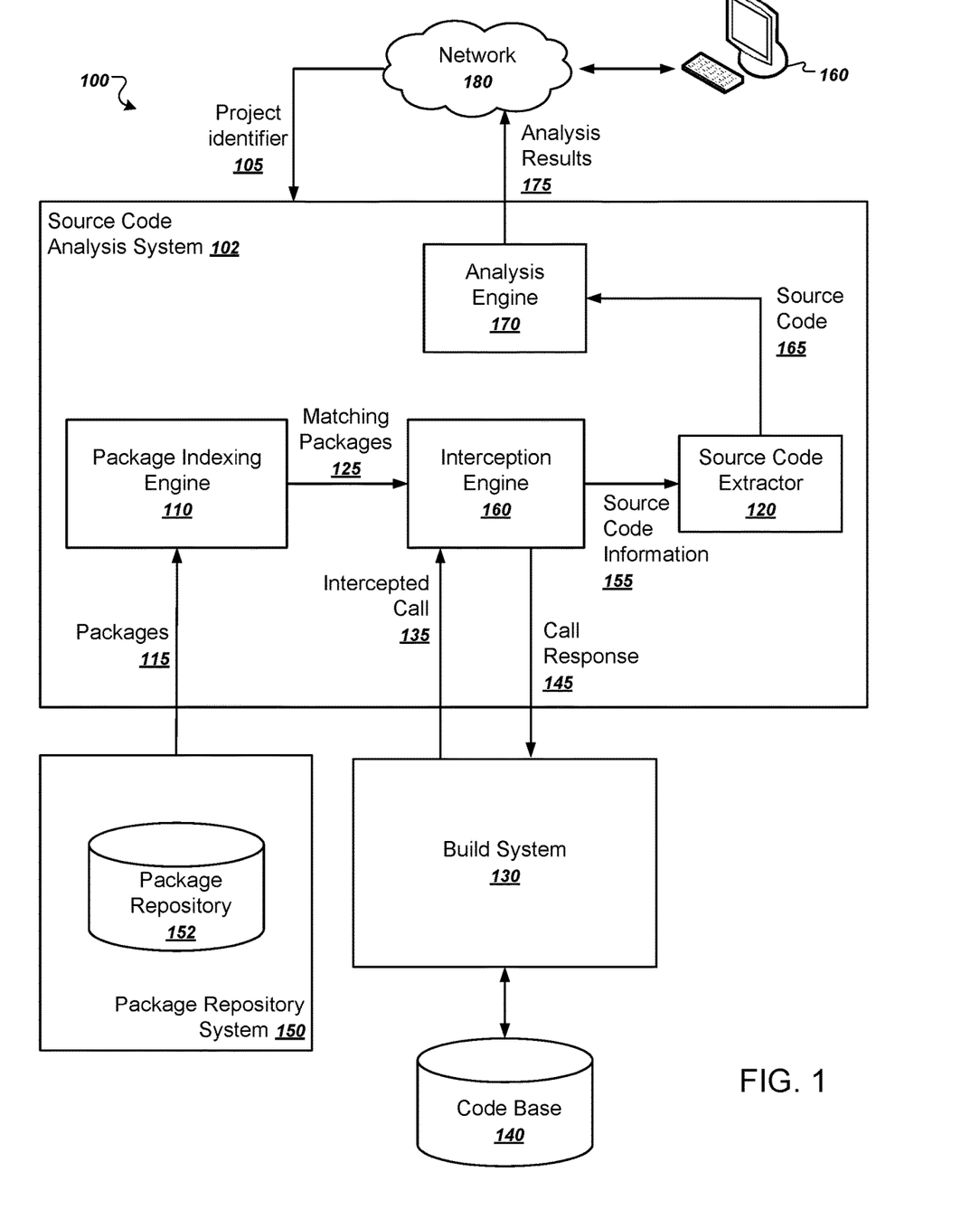
FIG. 1 is a diagram that illustrates an example system.

FIG. 1 is a diagram that illustrates an example system 100. The system 100 includes a user device 160 in communication with a source code analysis system 102 over a network, 180, which can be any appropriate communications network. The system 100 is an example of a system in which a source code analysis system 102 automatically builds one or more snapshots of a software project in order to extract and analyze source code of the software project.

The source code analysis system 102 includes a package indexing engine 110, a source code extractor 120, an interception engine 160, and an analysis engine 170. The components of the source code analysis system 102 can be implemented as computer programs installed on one or more computers in one or more locations that are coupled to each through a network. Alternatively, the source code analysis system 102 can be installed in whole or in part on a single computing device, e.g., the user device 160.

The source code analysis system 102 can communication with a package repository system 150. The package repository system 150 provides one or more packages 115 that are available to be installed on the build system 130. The package repository can be any appropriate repository that provides access to software packages, e.g., the Debian package repository.

The source code analysis system 102 is also in communication with a build system 130. The build system 130 can be installed on a single computer or on multiple computers. For example, the build system 130 can be a distributed build system including thousands of computers that cooperate to build code in a code base in parallel. The source code analysis system 102 and the build system 130 can be installed on different computing devices that are in communication with one another, e.g., using the network 170, or the source code analysis system 102 and the build system 130 can be installed on a same computing device.

The build system 130 builds source code, e.g., using a build utility and one or more compilers, which can be conventional components for building and compiling source code. For example, the build system can use the "make" utility for Linux and Unix systems or a batch script that coordinates compiling of source code in the code base 140.

A user of the user device 160 can provide a project identifier 105 of a software project to the source code analysis system 102. The project identifier 105 is part of an explicit or implicit request to automatically build snapshots of the software project. For each snapshot, the source code analysis system can perform an instrumented build in order to extract precisely the source code built by the build system 130.

The package indexing engine 110 can communicate with the package repository system 150 in order to obtain information about available packages. The package indexing engine 110 can receive one or more packages 115 from the package repository, which can occur before or after the request to build the software project is received. The package indexing engine 110 can then index information in the received packages. For example, the package indexing engine 110 can map each unique filename or file path to one or more packages having that filename or file path.

The interception engine 160 can attempt a build of a snapshot. To do so, the interception engine 160 can provide a build configuration to the build system 130. The build configuration can modify the build system 130 to set up an attempted build of a particular snapshot of the software project. For example, a build utility, compilers, packages to be installed, or some combination of these, can be specified by a particular build configuration.

As part of this process, the build configuration can specify downloading or retrieving the snapshot to be built from a code base 140. The build configuration can then cause the build system 130 to run one or more build commands to attempt a build of the snapshot in the code base 140 using a build utility.

For each attempted build, the source code analysis system 102 can instrument the build system 130, which causes the interception engine 160 to receive intercepted calls 135 made by the build system 130. Each intercepted call is a request by a process executing on the build system for a particular computing resource. An intercepted call can be a library call, e.g., a call to a standard library of the build system; or a system call, e.g., a call to the system kernel for particular resources, e.g., file I/O from the operating system. The techniques described in this specification can be implemented by intercepting library calls, system calls, or some combination of the two. Whether a system intercepts library calls, system calls, or both is a technical decision that is closely tied to the underlying computing platform. Some calls include requests to invoke an executable in a new process or to invoke another system command. For example, any time a compiler is called by the build system 130, the call to invoke the compiler can be passed as an intercepted call 135 to the interception engine 160. This mechanism can be used to provide source code file information 155 to the source code extractor 120 whenever a compiler is called to compile a source code file on the build system 130. The source code file information 155 generally specifies the location of a source code file or the source code itself contained in the source code file. Suitable techniques for instrumenting a build system are described in more detail in U.S. Pat. Nos. 9,110,737 and 9,489,182, which are herein incorporated by reference in their entirety. Regardless of the specific instrumentation technique that is used, the source code extractor 120 can use the source code file information 155 to access precisely the source code that will be compiled by the build system 130.

If an intercepted call 135 references a file on the build system 130 that does not exist, the interception engine 160 can prevent the build from failing by installing any necessary packages required for the call to succeed. To do so, the interception engine can communicate with the package indexing engine 110 to obtain one or more matching packages 125 that each include an instance of a filename referenced by the intercepted call 135. The interception engine 160 can then install one or more of the matching packages 125 before actually carrying out the intercepted call 135. After performing this process of installing the missing package, the interception engine 160 can provide a call response 145 to the build system 130 so that the build can continue as if the missing package had existed all along. In this way, the interception engine 160 essentially supervises the build process on the build system 130 in order to increase the likelihood that the build process succeeds. Doing so can greatly increase the likelihood that automatically configured builds will succeed.

Even failed build processes can still be useful for analyzing at least some source code of a snapshot. Therefore, the interception engine 160 can take steps to prolong the amount of time that the build process is still considered successful by the build system 130.

While the build process is still successful, the source code extractor 120 can provide the extracted source code 165 to an analysis engine 170. The analysis engine 170 can generate a variety of static analysis results 175 from the extracted source code 165, which can be reported back to the user device 160 as analysis results 175. The analysis results 175 can represent any appropriate static analysis results, e.g., source code defects, attributions of source code contributions including defect introductions and removals, values of various source code metrics, and visual representations of large scale trends in the code base 140.

Figure 2:
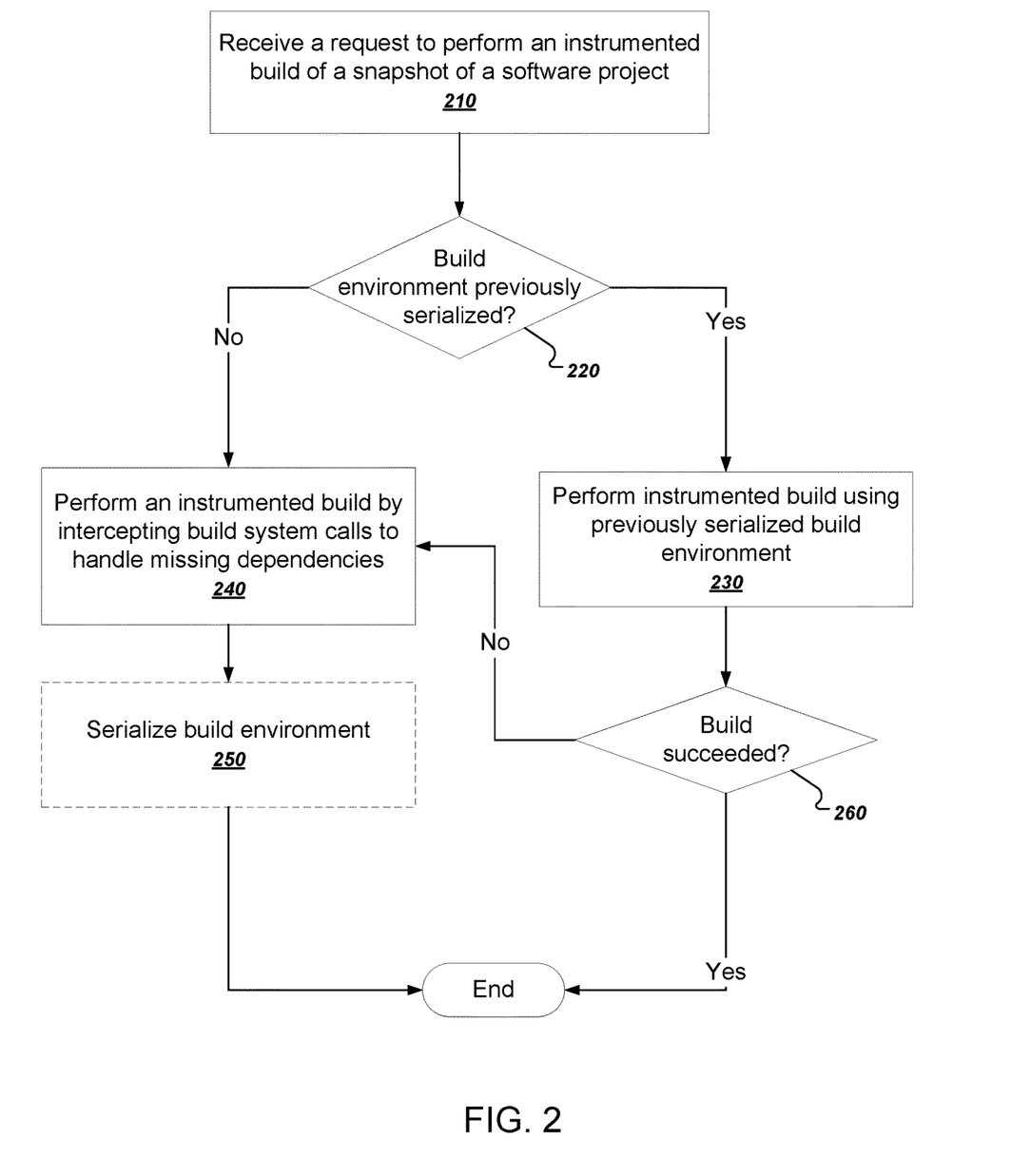
FIG. 2 is a flowchart of an example process for performing an instrumented build of a software project.

FIG. 2 is a flowchart of an example process for performing an instrumented build of a software project. For convenience, the process will be described as being performed by a system of one or more computers, located in one or more locations, and programmed appropriately in accordance with this specification. For example, a source code analysis system, e.g., the source code analysis system 102 of FIG. 1, appropriately programmed, can perform the process.

The system receives a request to perform an instrumented build of a snapshot of a software project. (210). The request can originate from user input that explicitly identifies the project. The system can also automatically select the project as part of a process to automatically analyze many different snapshots of a single software project or many different software projects.

The system determines whether the build environment for the software project has been previously serialized (220). If the build environment has been previously serialized, this means that the system has previously executed a successful instrumented build in which all missing dependencies were successfully handled. The system can then reuse that serialized environment rather than handling the missing dependencies from scratch each time the build is run.

The system can use any appropriate environment serialization tools that allow the system to recreate a build environment. For example, the previously serialized environment can be stored as a binary image, as a sequence of install and build commands, or as a container image, to name just a few examples. Containers are isolated user computing spaces of a virtual or physical machine. Containers isolate application instances from other applications and components of the underlying computing platform.

If the build environment was previously serialized, the system performs the instrumented build using the previously serialized build environment (branch to 230). The system can deserialize the build environment and initiate the instrumented build in the deserialized build environment.

The system can then determine whether or not the build using the previously serialized build environment was successful (260). If so, processing ends (branch to end).

If the build using the previously serialized build environment was not successful (260), the system performs an instrumented build by intercepting build system calls to handle missing dependencies (branch to 240). In other words, the system attempts to handle a sufficient number of missing dependencies in the environment for the build process to succeed. This fall-back mechanism is useful for when a project changes the required dependencies, which often happens between snapshots. Example techniques for handling missing dependencies are described in more detail below with reference to FIG. 3.

The system also performs the instrumented build by intercepting build system calls to handle missing dependencies (240) if the build environment was not previously serialized (220).

The system optionally serializes the build environment (250). After handling the missing dependencies in the build environment, the system need not discard all the work that was performed. Instead, the system can serialize the build environment that led to a successful instrumented build for use in future builds of the snapshot or other snapshots of the same project.

Figure 3:
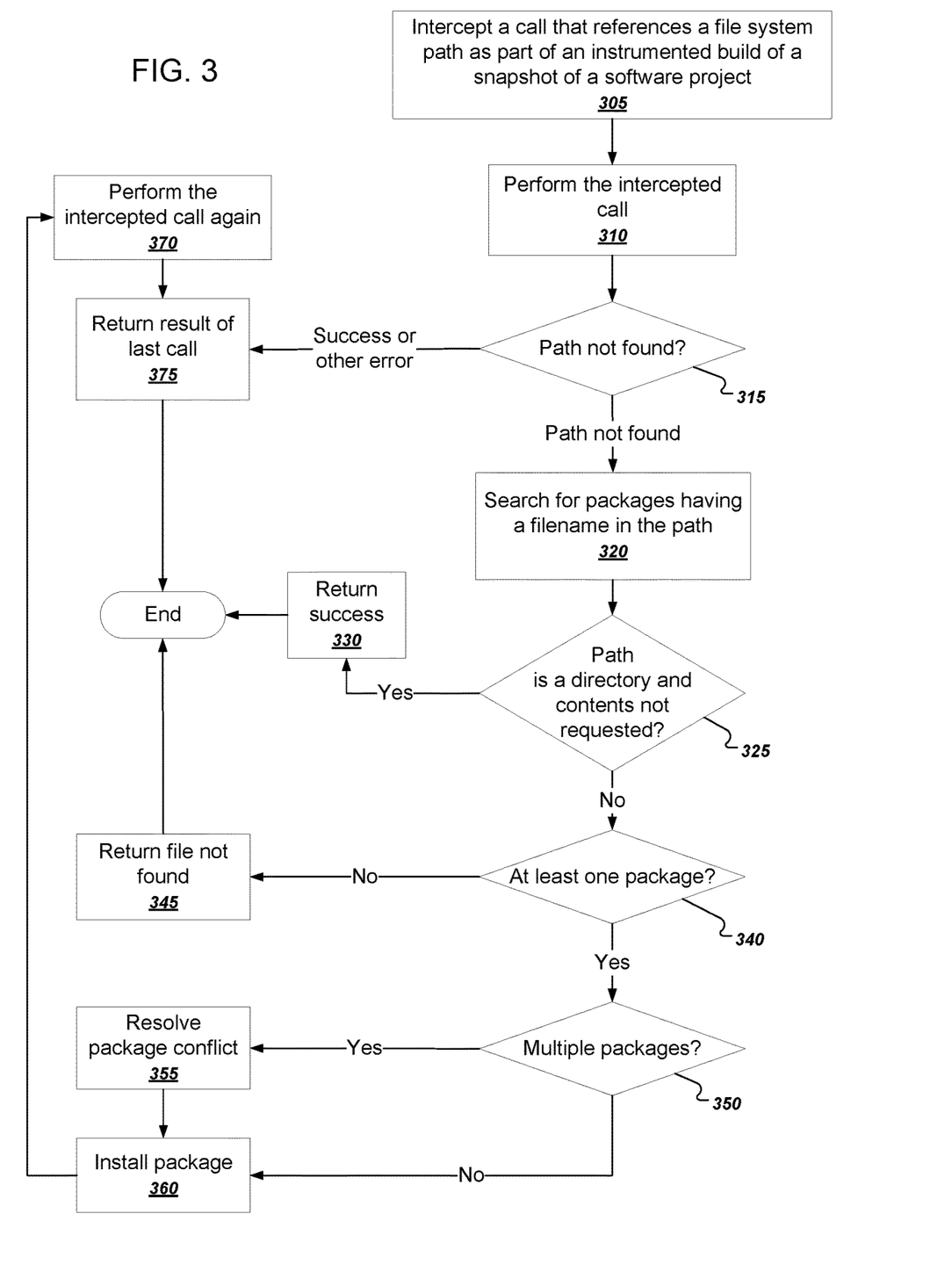
FIG. 3 is a flowchart of an example process for handling missing dependencies during an instrumented build.

FIG. 3 is a flowchart of an example process for handling missing dependencies during an instrumented build. For convenience, the process will be described as being performed by a system of one or more computers, located in one or more locations, and programmed appropriately in accordance with this specification. For example, a source code analysis system, e.g., the source code analysis system 102 of FIG. 1, appropriately programmed, can perform the process.

The system intercepts a call from the build system that references a file system path as part of an instrumented build of a snapshot of a software project (305). As described above, instrumenting the build process allows the system to inspect calls made by the build system during the build, e.g., calls to the underlying operating system for computing resources.

The system performs the intercepted call (310). In other words, the system makes the call to the appropriate build system resource and waits for a response. For example, as described above, the call can be a request to read from the particular file system path or a request to execute a new process using an executable file specified by the file system path.

The system determines if the path was not found (315). If the path referenced by the call already exists, the system need not perform any further special processing. Thus, the system simply returns the result of the call (branch to 375).

Likewise, if there were any other errors that did not relate to missing file system paths, the system need not address them as part of this process. Instead, the system can simply return the result of the call for the build system to handle appropriately. Thus, if the result of the call was an error not related to a missing path (315), the system can return the result of the call (branch to 375).

If the result of the call was an error indicating that the path was not found (315), the system searches for packages having a filename in the path (branch to 320). For example, the system can query a package index to identify one or more packages having a filename in the path.

The system can maintain a mapping between filenames and packages that have those filenames. For example, the system can parse publically available package repositories and index the filenames in all available package repositories. This results in an index that maps each unique filename to one or more packages. Then, when a call made during an instrumented build requests a particular filename, the system can search the index to identify one or more matching packages having the requested filename.

The system determines whether the path is a directory and whether the contents were not requested (325). In other words, the system determines whether the call referenced a directory but did not request the contents of the directory.

If so, the system simply immediately returns an indication of success (branch to 330). In other words, the system can completely bypass the original call altogether if the path in the call referenced a directory rather than a file.

The reason for is shortcut is that bypassing purely directory operations acts to delay the installation of certain packages, possibly indefinitely. The risk of attempting to install a package too early is that if the package installation fails or if the choice of installed package turned out to be incorrect, the entire build can fail without much source code analysis being achieved. Therefore, delaying the installation of packages until actual file contents are needed significantly increases the likelihood that the build will succeed. And, even if the build does not succeed, this intentional delay can increase the length of time that the build runs before failing, thereby increasing the amount of source code that can be extracted and analyzed before failing.

Thus, if the call only queries the existence of a directory in a package, the system need not install the package. Instead, the system bypasses installation of any package altogether and simply, potentially incorrectly, indicates to the calling process that the operation succeeded.

Otherwise, the system can then determine if at least one package had the requested filename (340). If not, the system can return an error indicating that the file was not found (branch to 345). This may cause the build system to search for the file in a different location, to complete the build in a less featureful configuration, or to fail.

Then the system can then determine if one or multiple packages matched the requested filename (350). If just one package was a match, the system can install the package in the build environment (branch to 360). The system can install the package in the build environment by asking a system package manager to install the relevant package in the build environment. Alternatively, the system can extract the relevant files from the package and directly install them in the build system. The latter approach can provide more flexibility because it allows installing dependencies at a finer granularity than entire packages. This is advantageous because installing entire packages often involves installing packages those packages depend on, and those packages they depend on, and so on.

The system can then execute the originally intercepted call as normal (370) and return the result of the call, e.g., an indication of success (375).

If, however, there were multiple matching packages (350), the system must first resolve the package conflict (branch to 355). In general, the system will install just one package of all the available matching packages. The system can resolve the conflict in a variety of ways. For example, the system can maintain or obtain statistics about the respective popularity of packages in the index or the respective frequency at which packages in the index are installed. The statistics can be computed from external information about the packages, or the statics can be computed from internal information about packages that are installed on the source code analysis system. The internal information can reflect packages that are used by all analyzed software projects in general, or the internal information can reflect just packages that are automatically installed as part of the build process. For example, it could be the case that some packages, while not generally popular, very commonly occur as missing dependencies during a software builds. In that scenario, the system can install the package that is missing the most often rather than a package that is popular generally. The system can then install the most popular package or the package that is installed the most frequently according to the computed statistics. Alternatively or in addition, the system can rule out packages that are not compatible with the build system.

In some implementations, the system installs the package having the shortest name. This is because there is in general a correlation between package name length and general compatibility or adoption of the package. In other words, packages having very long names tend to be adopted less frequently than packages having short names. Although this heuristic is not expected to be successful in all instances, a large scale analysis system is most interested in maximizing probabilities of success over many software projects. And in practice, installing the package having the shortest name is a useful way to resolve package conflicts.

After resolving the package conflict (355), the system can install the selected package (360), perform the intercepted call (370), and return the result of the call (375).

An additional practical use for determining when a build process has missing package dependencies is in generating a list of dependencies in the first instance. For example, the maintainers of a software package could use the intercepted build system calls to automatically produce a dependency list, rather than manually generating a dependency list.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving, by source code analysis system, a request to perform an instrumented build of a snapshot of a software project;

initiating, by the source code analysis system, an instrumented build of the snapshot of the software project by issuing one or more build commands on a build system for the snapshot, wherein the build system comprises an operating system;

intercepting, by a source code analysis system, a call from the build system to the operating system that references a file system path;

determining that the file system path does not exist on the build system;

in response, searching for one or more source code packages having a filename in the file system path;

identifying a source code package to install having the filename in the file system path;

installing the source code package on the build system; and after installing the source code package on the build system, executing the intercepted call.

Embodiment 2 is the method of embodiment 1, wherein identifying a source code package to install comprises:

determining that multiple packages provide the filename in the file system path; and selecting one package of the multiple packages as the source code package to install on the build system.

Embodiment 3 is the method of embodiment 2, wherein selecting one package of the multiple packages comprises:

computing one or more statistics representing the popularity or frequency of installation of the multiple packages; and selecting a particular package that is the most popular or that is installed the most frequently.

Embodiment 4 is the method of embodiment 2, wherein selecting one package of the multiple packages comprises:

determining which package of the multiple packages has the shortest name; and selecting the package having the shortest name.

Embodiment 5 is the method of any one of embodiments 1-4, further comprising:

intercepting, by a source code analysis system, a second call from the build system that references a second file system path;

determining that the file system path is a directory of a particular package; and returning, to the build system, an indication that the intercepted second call succeeded without installing the particular package.

Embodiment 6 is the method of any one of embodiments 1-5, wherein searching for one or more source code packages having a filename in the file system path comprises:

searching an index that maps each unique filename to one or more source code packages having the filename.

Embodiment 7 is the method of embodiment 6, further comprising:

obtaining a plurality of source code packages;

identifying filenames in the plurality of source code packages; and generating the index by mapping each unique filename in the plurality of packages to one or more source code packages having the unique filename.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:

one or more computers and one or more storage devices storing instructions that are operable, when executed by the one or more computers, to cause the one or more computers to perform operations comprising:

receiving, by a source code analysis system, a request to perform an instrumented build of a snapshot of a software project;

initiating, by the source code analysis system, the instrumented build of the snapshot of the software project by issuing one or more build commands on a build system for the snapshot, wherein the build system comprises an operating system;

intercepting, by the source code analysis system, a call from the build system to the operating system, where the call references a file system path;

determining that the file system path does not exist on the build system;

determining whether the file system path is referencing a directory or a file;

in response to determining that the file system path is referencing the directory, bypassing the call by providing an indication to the build system that the call to the file system path was successful despite the directory not existing on the build system; and in response to determining that the file system path is referencing the file:

searching for one or more source code packages having a filename of the file;

identifying a source code package to install having the filename;

installing the source code package on the build system; and after installing the source code package on the build system, executing the intercepted call.

2. The system of claim 1, wherein identifying the source code package to install comprises:

determining that multiple packages have filenames corresponding to the filename of the file; and selecting one package of the multiple packages as the source code package to install on the build system.

3. The system of claim 2, wherein selecting the one package of the multiple packages comprises:

computing one or more statistics representing a popularity or a frequency of installation of each package of the multiple packages; and selecting a particular package that is most popular or that is installed most frequently according to the computed one or more statistics.

4. The system of claim 2, wherein selecting the one package of the multiple packages comprises:

determining which package of the multiple packages has a shortest name; and selecting a particular package having the shortest name.

5. The system of claim 1, wherein searching for the one or more source code packages having the filename of the file includes:

searching an index that maps each unique filename to one or more source code packages having the filename of the file.

6. The system of claim 5, wherein the operations further comprise:

obtaining a plurality of source code packages;

identifying filenames in the plurality of source code packages; and generating the index by mapping each unique filename in the plurality of packages to one or more source code packages having the unique filename.

7. The system of claim 1, wherein the directory is delayed from being installed on the build system for a determined period of time.

8. The system of claim 1, wherein the source code analysis system supervises the instrumented build on the build system.

9. The system of claim 1, wherein the source code analysis system prolongs an amount of time that the instrumented build is considered successful even though the directory does not exist on the build system.

10. The system of claim 1, wherein, while the instrumented build is still considered to be successful, analytics are performed to identify source code defects.

11. A computer-implemented method comprising:

receiving, by a source code analysis system, a request to perform an instrumented build of a snapshot of a software project;

initiating, by the source code analysis system, the instrumented build of the snapshot of the software project by issuing one or more build commands on a build system for the snapshot, wherein the build system comprises an operating system;

intercepting, by the source code analysis system, a call from the build system to the operating system, where the call references a file system path;

determining that the file system path does not exist on the build system;

in response to the determining that the file system path does not exist on the build system, searching for one or more source code packages having a filename in the file system path;

identifying a source code package to install having the filename in the file system path, wherein identifying the source code package to install comprises (i) determining that multiple packages provide the filename in the file system path, (ii) determining which package of the multiple packages has the shortest name, and (iii) selecting a specific package having the shortest name as the source code package to install;

installing the source code package on the build system; and after installing the source code package on the build system, executing the intercepted call.

12. The method of claim 11, wherein selecting the one package of the multiple packages comprises:

computing one or more statistics representing a popularity or a frequency of installation of each package of the multiple packages; and selecting a particular package that is most popular or that is installed most frequently according to the computed one or more statistics.

13. The method of claim 11, further comprising:

intercepting, by the source code analysis system, a second call from the build system that references a second file system path;

determining that the file system path is a directory of a particular package; and returning, to the build system, an indication that the intercepted second call succeeded without installing the particular package.

14. The method of claim 11, wherein searching for the one or more) urce code packages having the filename in the file system path comprises:

searching an index that maps each unique filename to the one or more source code packages having the filename.

15. The method of claim 14, further comprising:

obtaining a plurality of source code packages;

identifying filenames in the plurality of source code packages; and generating the index by mapping each unique filename in the plurality of packages to the one or more source code packages having the unique filename.

16. A computer program product, encoded on one or more hardware storage devices, comprising instructions that when executed by one or more computers cause the one or more computers to perform operations comprising:
    receiving, by a source code analysis system, a request to perform an instrumented build of a snapshot of a software project;
    initiating, by the source code analysis system, the instrumented build of the snapshot of the software project by issuing one or more build commands on a build system for the snapshot, wherein the build system comprises an operating system;
    intercepting, by the source code analysis system, a call from the build system to the operating system, where the call references a file system path;
    determining that the file system path does not exist on the build system;
    in response to the determining that the file system path does not exist on the build system, searching for one or more source code packages having a filename in the file system path;
    identifying a source code package to install having the filename in the file system path;
    installing the source code package on the build system;
    after installing the source code package on the build system, executing the intercepted call;
    intercepting, by the source code analysis system, a second call from the build system, where the second call references a second file system path;
    determining that the second file system path is a directory of a specific package; and
    returning, to the build system, an indication that the intercepted second call succeeded without installing the specific package.

17. The computer program product of claim 16, wherein identifying the source code package to install comprises:
    determining that multiple packages provide the filename in the file system path; and
    selecting one package of the multiple packages as the source code package to install on the build system.

18. The computer program product of claim 17, wherein selecting the one package of the multiple packages comprises:
    computing one or more statistics representing a popularity or a frequency of installation of each package of the multiple packages; and
    selecting a particular package that is most popular or that is installed most frequently according to the computed one or more statistics.

19. The computer program product of claim 17, wherein selecting the one package of the multiple packages comprises:
    determining which package of the multiple packages has a shortest name; and
    selecting a particular package having the shortest name as the one package.

20. The computer program product of claim 16, wherein searching for the one or more source code packages having the filename in the file system path comprises:
    searching an index that maps each unique filename to one or more source code packages having the filename, and wherein the operations further comprise:
    obtaining a plurality of source code packages;
    identifying filenames in the plurality of source code packages; and
    generating the index by mapping each unique filename in the plurality of packages to the one or more source code packages having the unique filename.

\* \* \* \* \*